United States Patent [19]
Wickham

[11] 3,882,723
[45] May 13, 1975

[54] FLUID PRESSURE APPARATUS

[75] Inventor: David John Wickham, London, England

[73] Assignee: Westinghouse Brake and Signal Co., Ltd., London, England

[22] Filed: Oct. 8, 1971

[21] Appl. No.: 187,614

[30] Foreign Application Priority Data
Oct. 26, 1970 United Kingdom............... 50800/70
Apr. 2, 1971 United Kingdom............... 08507/71
Apr. 2, 1971 United Kingdom............... 08508/71

[52] U.S. Cl. ...................... 73/199; 73/39; 73/203; 73/205; 137/501
[51] Int. Cl. ......................... G01f 1/00; G01p 5/14
[58] Field of Search............ 73/203, 205 R, 39, 199; 116/55; 137/501, 503

[56] References Cited
UNITED STATES PATENTS

| | | | |
|---|---|---|---|
| 1,380,220 | 5/1921 | Lambeth.............................. | 116/55 |
| 1,726,463 | 8/1929 | Wünsch............................... | 73/203 |
| 1,910,513 | 5/1933 | Yancey................................ | 116/55 |
| 2,044,806 | 6/1936 | Naiman............................... | 73/203 |
| 2,097,829 | 11/1937 | Bassler................................ | 73/199 |
| 2,192,042 | 2/1940 | Hoffmann........................... | 137/501 |
| 2,943,485 | 7/1960 | Byrne.................................. | 73/199 |

FOREIGN PATENTS OR APPLICATIONS
1,186,393   4/1970   United Kingdom

Primary Examiner—James J. Gill
Attorney, Agent, or Firm—Larson, Taylor & Hinds

[57] ABSTRACT

A fluid pressure comparison apparatus including a pressure responsive member displaceable by the difference between two pressure sources being compared to vent fluid from one of the sources, when its pressure is greater than the other, through a port whose aperture is varied by the displacement of the pressure responsive member. The flow of vented fluid is measured in one of many possible ways to determine the excess pressure. The measurement may be displayed on an indicator or applied to control associated equipment. Various arrangements embodying the apparatus may be used for flow indication, flow control, leakage detection and indication and as warning or control equipment. The pressure responsive member is shown as a nylon reinforced rubber diaphragm but the nature of the member will depend on the absolute as well as the relative values of the pressures compared.

11 Claims, 5 Drawing Figures

FLUID PRESSURE APPARATUS

This invention relates to fluid pressure apparatus incorporating a device for comparing fluid pressures.

According to the invention there is provided fluid pressure apparatus for comparing first and second fluid pressures including a fluid-tight vessel internally divided into a first and second chamber by a pressure responsive member, said first chamber having a first port for a first fluid pressure signal, said second chamber having a second port for a second fluid pressure signal, and said second chamber having a third port, said pressure responsive member having a fluid-tight membrane with a portion deformable to close said third port when the force exerted on said pressure responsive member by the pressure in the first chamber exceeds the force exerted on said member by the pressure in the second chamber, the third port being vented through a restricted passage to atmosphere, the fluid pressure flow in said passage from said second chamber depending on the degree of closure of the third port by the deformation of the diaphragm in response to said excess force, the flow in said passage being a third fluid pressure signal.

The apparatus may include a fluid pressure signal utilisation arrangement responsive to said third signal.

The fluid pressure signal utilisation arrangement may be a pressure gauge, a relay valve or a flow-meter, and is preferably in the form of a closed volume connected to said passage.

The fluid-tight membrane may be a flexible, elastic diaphragm which may be of nylon reinforced rubber. The diaphragm may be circular, with the third port positioned in the second chamber adjacent the centre of the diaphragm. The third port may have a bore diameter no more than 1 percent of the diameter of the pressure responsive member.

According to one aspect of the invention there is provided a fluid pressure flow sensing arrangement in which said first port is connected to a first point on a fluid pressure conduit and said second port is connected to a second point on said fluid pressure conduit upstream from a first flow restrictor, which is itself upstream from said first point, through a second flow restrictor of similar flow characteristics to said first flow restrictor, the fluid pressure utilisation arrangement being responsive to the magnitude of said third signal to indicate the flow in said fluid pressure conduit.

The second restrictor may have similar flow characteristics to said first restrictor at a lower flow rate.

The fluid pressure conduit is provided with a fullbore by-passing the first restrictor and including a valve controlled by a closure element operable in response to the pressure difference across the first restrictor produced by fluid flow through the restrictor to the downstream part of the conduit. The closure element may be operated by a further pressure responsive member forming part of a wall of said first chamber to one side of which said further member is applied the fluid pressure in the first chamber and to the other side of which is applied the pressure in the fluid pressure conduit downstream from the first restrictor. The further pressure responsive member may include a diaphragm which may be provided with a follower to apply to the diaphragm the thrust of a resilient bias means.

The closure element may incorporate a further follower which transmits to the diaphragm the fluid pressure in said by-pass fluid path upstream of the valve over the full-bore of said path. A resilient bias means may be sized to apply to said diaphragm a differential loading to close the closure element until the pressure in said by-pass upstream of said valve exceeds that downstream of the valve by a predetermined amount. This predetermined amount may be selected to be greater than that pressure drop across the first restrictor created by the fluid flow through said restrictor necessary to maintain a fluid pressure system connected downstream of said first point in a charged, quiescent condition.

The arrangement may also include means to bias the pressure responsive member to compensate for the out-of-balance force on said pressure responsive member due to the presence of the third port.

Embodiments of the invention will now be described with reference to the accompanying drawings in which.

Figure 1:
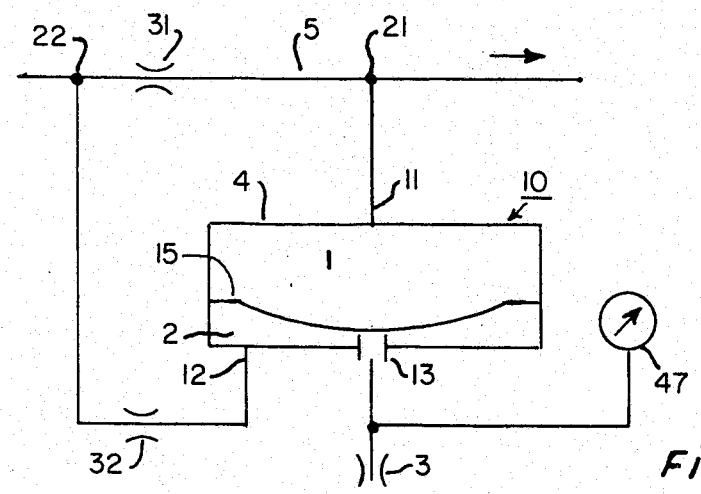
FIG. 1 shows a flow sensing and measuring arrangement.

Referring to FIG. 1 a fluid pressure device is generally indicated at 10 and consists of a fluid-tight vessel 4 divided into a first chamber 1 and a second chamber 2 by a pressure responsive member in the form of a diaphragm 15. The first chamber is provided with a first input port 11, the second chamber is provided with a second input port 12 and the second chamber is also provided with a third outlet port 13. The diaphragm 15 is arranged so that when displaced towards port 13 by the force acting on the diaphragm in chamber 1 exceeding the force acting on the diaphragm in chamber 2 the port 13 is closed by the diaphragm which may have a valve means not shown, operatively connected thereto. In a preferred arrangement the diaphragm itself acts as a valve means.

The diaphragm is a flexible membrane which is preferably a circle of nylon reinforced rubber sheet clamped between two parts of the vessel. Excess pressure in chamber 1 deforms the diaphragm to vary the flow through port 13 by partially or wholly closing the port in dependence on the degree of excess pressure. The diaphragm diameter is large compared with the port. A 50mm diaphragm of thickness 0.05mm and a 0.5mm port have been found satisfactory. The larger the diaphragm the more rapid the change of flow with excess pressure.

The port 13 is connected to atmosphere through one branch of a branched fluid pressure conduit and a choke 3, the other branch providing a connection point upstream of choke 3 so that the pressure at this point can be applied to a fluid pressure utilisation device. Such a device should preferably be in the form of a closed chamber so that the only leakage from port 13 is through choke 3. A suitable device would be a pressure gauge or a relay valve. The pressure venting from choke 3 may be arranged to give an audible signal.

In the arrangement shown in FIG. 1 reference 5 indicates a fluid pressure conduit which may be the brake pipe of a railway brake arrangement the normal direction of fluid pressure flow being indicated by the arrow. The first connection is made to the conduit 5 at point 21 and this point is connected to the first inlet port 11 of the device. A second connection is made to the conduit 5 at point 22 which point is upstream both of the first point 21 and of a portion 31 of the conduit which forms a restriction to flow through the conduit. The portion 31 may be some part of the piping having another function which inherently affects the flow e.g. the driver's brake valve. A connection is made between point 22 and the second inlet point 12 of the device this connection passing through a restriction 32. The restriction 32 is so chosen that it has similar flow characteristics to the restriction 31 but is of much smaller size. Flow through the connection between point 22 and port 12 will thus simulate the flow through the conduit 5 but will be at a much lower level so that consequent loss of fluid from conduit 5 through the conduit. It will be apparent that as fluid flows along the conduit 5 to the restriction 31 a pressure differential will be set up between points 22 and 21, point 21 being the lower pressure.

In describing the operation of the sensing arrangement shown in FIG. 1 it will be assumed that in the initial condition diaphragm 15 is closing port 13. Fluid flow to conduit 5 will therefore produce a pressure in chamber 1 representing the pressure at point 21 in conduit 5. There being no flow through port 13 the pressure in chamber 2 will build up to restriction 32 until the pressure in chamber 2 reaches that at point 22 of the conduit 5. Diaphragm 15 will now be displaced away from port 13 and flow from chamber 2 will commence. This flow will simulate that in the conduit 5 as the restrictors 31 and 32 are similar and supplied with pressure from the same point. The flow at port 13 will thus simulate that at point 21 in the conduit 5 and measurements made at this port will indicate the flow in conduit 5. Such measurements may be made by an in-line flow device such as that proprietary device called a "Rotameter." Alternatively the arrangement shown in the figure of a choke 3 and a pressure utilisation device having a closed chamber such as gauge 47 may be used. Gauge 47 can be calibrated in terms of the flow in conduit 5. Restrictors 32 of different sizes may be switched into the arrangement. The gauge scale may be changed by the switching operation.

In the particular application of the arrangement to a railway brake conduit whose flow and leakage characteristics are well-known the gauge 47 could be calibrated in terms of pipe-length (or, assuming leakage is independent of vehicle length, the number of vehicles) so that an operator could determine whether or not the brake system of a freshly assembled train was in order. A reference pointer on the gauge could then be set to indicate the initial leakage flow for that particular brake arrangement and this would enable the operator to determine at any point during the operation of the train that the leakage had not varied by an excessive amount.

Figure 2:
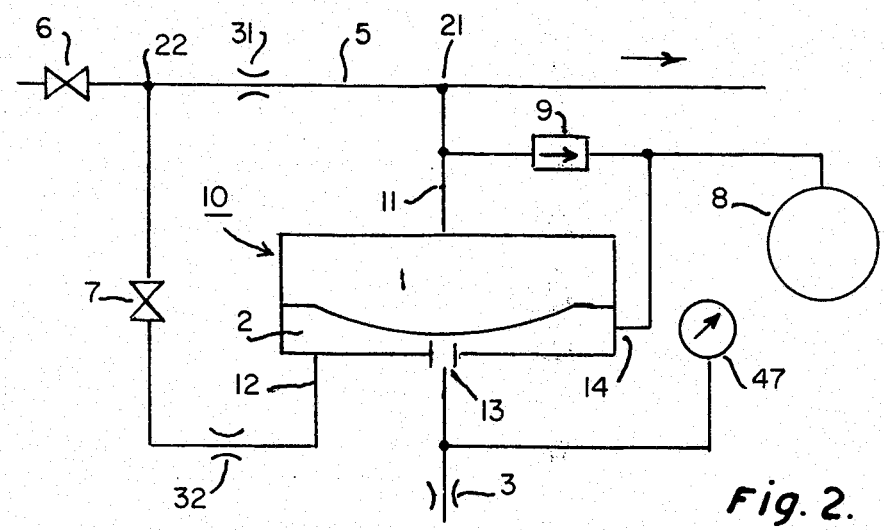
FIG. 2 shows a fluid pressure leakage and flow sensing and measuring arrangement.

FIG. 2 shows an arrangement by means of which leakage and flow from the conduit 5 can be measured. It will be seen that some elements are common to FIGS. 1 and 2 and these have the same reference numbers. A fourth port, 14, is provided on the chamber 2 of the device 10 and this is connected to the point 21 on conduit 5 through a check valve 9. A fluid pressure reservoir 8 is also connected to port 14. A cock 6 is provided in the conduit 5 and a further cock 7 is provided in the connection between point 22 and port 12 of the device 10. These cocks may be manually or electrically operated valves or may be in the form of magnet valves. The arrangement may be operated so that the gauge 47 indicates either flow through conduit 5 or leakage from this conduit. The operation of the arrangement will now be described. It will be seen that if both cocks 6 and 7 are open and the fluid pressure applied to inlet port 14 has no effect then the arrangement will respond to flow in conduit 5 in the same manner as the arrangement in FIG. 1 and this flow will be indicated by the gauge 47 or other suitable device as described before. When the cocks 6 and 7 are closed, conduit 5 having previously been charged with fluid, any leakage from conduit 5 will cause check valve 9 to operate to trap fluid pressure in reservoir 8 and apply this pressure to inlet 14. Diaphragm 15 will then be operated by the pressure differential across it to open port 13 to permit pressure to be discharged from reservoir 8. The rate at which pressure is discharged from reservoir 8 is determined by the rate at which the pressure in conduit 5 falls as it will be apparent that if the pressure in reservoir 8 falls more quickly than that in conduit 5 diaphragm 15 will be moved to close output port 13 until the drop in conduit 5 has equalised with the drop which has already taken place in reservoir 8. As the device 10 has a very low hysteresis and is extremely sensitive the alternate opening and closing of port 13 will be too fast for the gauge to respond to and the gauge will register a substantially steady value which is representative of the rate of leakage from conduit 5. The gauge 47 can be calibrated by reference to known leakage rate.

The arrangement shown in FIG. 2 provides a means by which the continuity and integrity of the brake pipe of a newly assembled train may be determined. As the characteristics of the brake pipe of a train are known the flow rate and leakage rate for a given train composition are easily determined. Furthermore the ratio of these two measurements is related to the length of the train and by determining the ratio from the measurement made and comparing this with a standard tabulated value a rapid and sufficiently accurate method of checking the brake pipe without having to take measurements at both ends of the train is provided. This of course will have considerable advantage in the saving of time and the avoiding of confusion between an operator at the front and rear of the train. The standard values may be separately tabulated or in the form of a sliding scale calculator which could be incorporated in the gauge.

Figure 3:
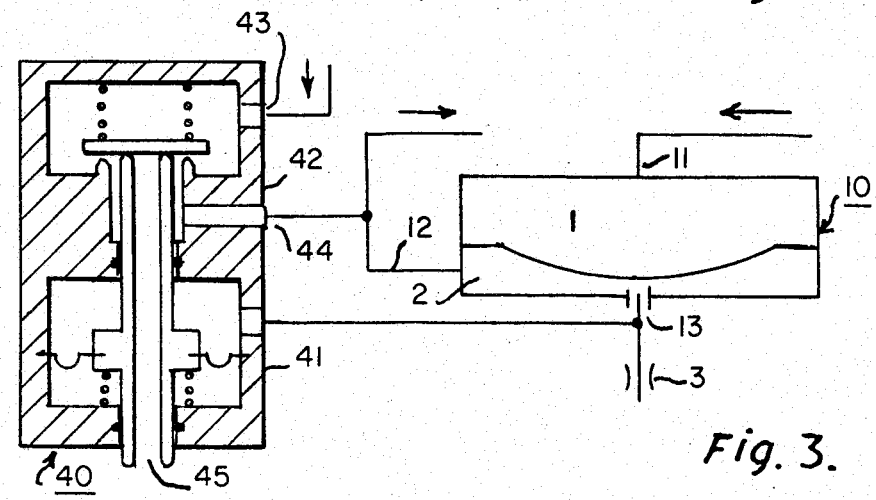
FIG. 3 shows a fluid pressure control arrangement.

Embodiments described above relate to the measurement of fluid pressure flow. However the invention is also applicable to the control of fluid pressure and an arrangement to control a pressure in accordance with a reference pressure is shown in FIG. 3. Similar parts in this Figure to those in FIGS. 1 or 2 have the same references. The device 10 has the reference pressure connected to port 11. The reference pressure may be derived from an electropneumatic converter or other suitable source and may itself be varied in accordance with a control signal. A relay valve 40 is provided having a closed volume control portion 41 and a self-lapping controlled portion 42. A fluid pressure supply to be controlled in accordance with the reference pressure is connected to inlet port 43 of controlled valve 42. The output pressure of valve 42, whose value is controlled by the positioning of the exhaust port 45 of the self-lapping valve by the control portion 41, is applied to the second inlet port 12 of the device 10. The device 10 will then compare the pressure in chamber 1 with that in chamber 2 as described above and open exhaust port 3 when the force on the diaphragm in chamber 2 exceeds that in chamber 1. The pressure upstream of the choke 3 is applied to the inlet port of the control portion 41 so that as the pressure at outlet port 44 rises beyond the reference value the pressure at port 13 is applied to the control portion 41 to adjust the position of the exhaust port to reduce the pressure at outlet port 44. The arrangement thus provides a closed control loop for the pressure supplied from ports 44. The active element of the control loop is provided by the device 10. The sensitivity of the active element determines the performance of the control loop and as the sensitivity of the device 10 is high the response of the control loop will be extremely good; furthermore the closed volume of chamber 1 ensures that there is no continuous loss of air from the reference. If the reference pressure and output pressure are not in a 1:1 relationship the effective areas of the pressure responsive member in each chamber may be adjusted to compensate for this.

Figure 4:
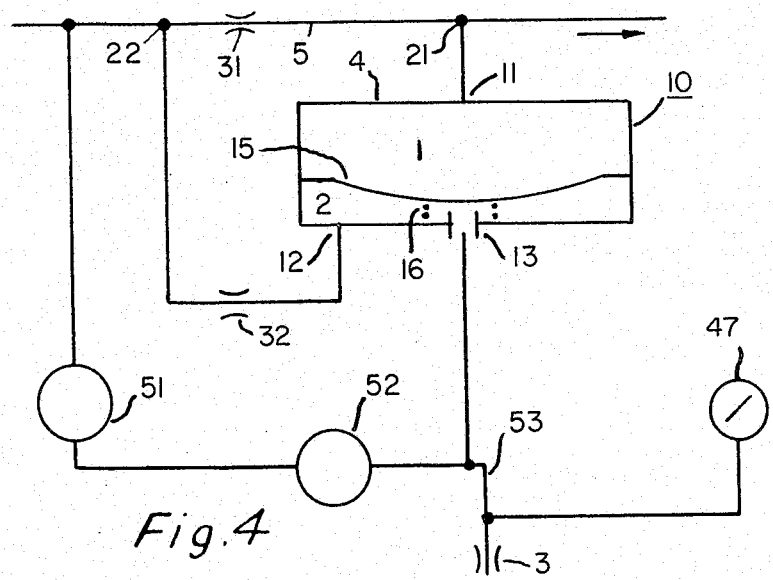
FIG. 4 shows a modified flow sensing and measuring arrangement.

FIG. 4 shows a fluid pressure device. Similar parts to those in previous Figures have the same references. The device is generally indicated at 10 and consists of a fluid-tight vessel 4 divided into a first chamber 1 and a second chamber 2 by a pressure responsive member in the form of a diaphragm 15. The first chamber is provided with a first input port 11, the second chamber is provided with a second input port 12 and the second chamber is also provided with a third outlet port 13. A spring 16 acts on the diaphragm to compensate for the out-of-balance force resulting from the reduction of the area of one side of the diaphragm by the port 13. Diaphragm 15 is arranged so that when displaced towards port 13 by the net force acting on the diaphragm in chamber 1 the port is closed by the diaphragm which may have a valve means, not shown, operatively connected thereto. In a preferred arrangement the diaphragm itself acts as a valve means.

The diaphragm is a flexible membrane which is preferably a circle of nylon reinforced rubber sheet clamped between two parts of the vessel. Excess pressure in chamber 1 deforms the diaphragm to vary the flow through port 13 by partially or wholly closing the port dependence on the degree of excess pressure. The diaphragm diameter is large compared with that of the port. A 50mm diaphragm of thickness 0.05mm and a 0.5mm port have been found satisfactory. The larger the diaphragm is with respect to the port the more rapid and accurate is the change of flow in excess pressure conditions.

The port 13 is connected to atmosphere through one branch of a branched fluid passage 53 and a choke 3 the other branch providing a connection point upstream of choke 3 so that the pressure at this point can be applied to a fluid pressure utilisation device. Such a device is preferably in the form of a closed chamber so that the only leakage from port 13 is through choke 3. A suitable device would be a pressure gauge or relay valve. The pressure venting from choke 3 may be arranged to give an audible signal.

In the drawing the fluid pressure device is arranged to indicate the flow in a fluid pressure conduit 5. The operation of this arrangement is described above. The flow in the fluid pressure conduit 5 is indicated by the flow in the passage 53 which flow varies in accordance with variations in the flow in conduit 5. Passage 53 is charged with fluid pressure from chamber 2 by the action of diaphragm 15 on port 13. The pressure in passage 53 is vented through the choke 3. The pressure in passage 53 will thus be intermediate between the pressure in chamber 2 and the atmospheric pressure to which choke 3 vents. The value of this intermediate pressure will vary as the flow through conduit 5 varies the pressure drop through choke 31 and therefore the pressure difference across diaphragm 15. The intermediate pressure will be indicated on pressure gauge 47 which may be calibrated in terms of flow in conduit 5. This arrangement is satisfactory but gauge 47 has a low level non-linear scale-shape which makes it difficult for low values of flow to be read accurately. The non-linearity of the scale-shape has three causes. Firstly the out-of-balance of the forces on the diaphragm due to the port 13. This out-of-balance is most noticeable when the flow from chamber 2 to exhaust is low as a low flow is reduced by a larger proportion than a higher value of flow. Accordingly spring 16 is sized to compensate at lower values of flow. It will be realised that any particular spring would only compensate correctly at a particular flow level but a compromise spring size can be achieved which results in an improvement at the lower end of the scale of the gauge 47.

A second factor is that the relationship of pressure drop across a choke to flow through a choke is only linear when the flow is sonic. In a particular embodiment this corresponds to a pressure drop across choke 3 of about 20 p.s.i. Accordingly it is proposed to supply an additional fluid flow to passage 53 of a fixed value which will ensure sonic flow through choke 3 under all conditions. This flow will of course bias the gauge 47 but this is in itself an advantage as the third problem is that normally a pressure gauge does not indicate flow reliably at small fractions of its full scale deflection. In the illustrated application of the device the bias flow is derived from the fluid pressure conduit 5 through a first valve 51 which reduces the pressure in conduit 5 to a fixed value which will be maintained under all fluid pressure levels in conduit 5. The thus-stabilised output pressure of valve 51 is applied to a constant pressure difference valve 52. This valve may be of the type described in U.K. Pat. No. 1,211,708.

Such a valve, when supplied with a stabilised pressure will maintain a fixed pressure drop across an orifice in the valve and therefore provide a constant flow of fluid from an output port. The orifice in valve 52 is chosen with regard to the stabilised pressure and to choke 3 and the gauge 47. In the particular arrangement mentioned above the valve 52 is arranged to provide a fluid flow which will maintain 20 p.s.i. in passage 53 in the absence of any flow from port 13. Gauge 47 may then be calibrated so that the pressure of 20 p.s.i. is indicated as a zero flow from port 13 and therefore through conduit 5. A substantially linear scale will then result when the gauge is calibrated for various flows through port 13 and therefore through conduit 5.

If it is not desired to compensate to the non-linearity of the scale-shape to the degree described above the valve 52 may be omitted. This will cause the scale-shape to become non-linear towards the high end but the lower end of the scale will still be linear and a position can be marked corresponding to zero flow through port 13. Such an arrangement may therefore have some application.

A further simplification is achieved by omitting both the valves 51 and 52 and connecting conduit 5 directly to passage 53. This can be arranged to ensure sonic flow through choke 3 and an indication of zero flow on gauge 47 but the position of this indication on the scale will vary with the pressure in conduit 5. If provision is made for the zero to be adjusted to compensate for this variation in supply pressure a further useful arrangement is achieved.

The arrangements described with reference to FIG. 4 relate to the measurement of flow in a conduit but are not restricted to these applications. Furthermore the additional flow supplied to passage 53 need not be derived from the flow which is being measured but may come from a separate source..

Figure 5:
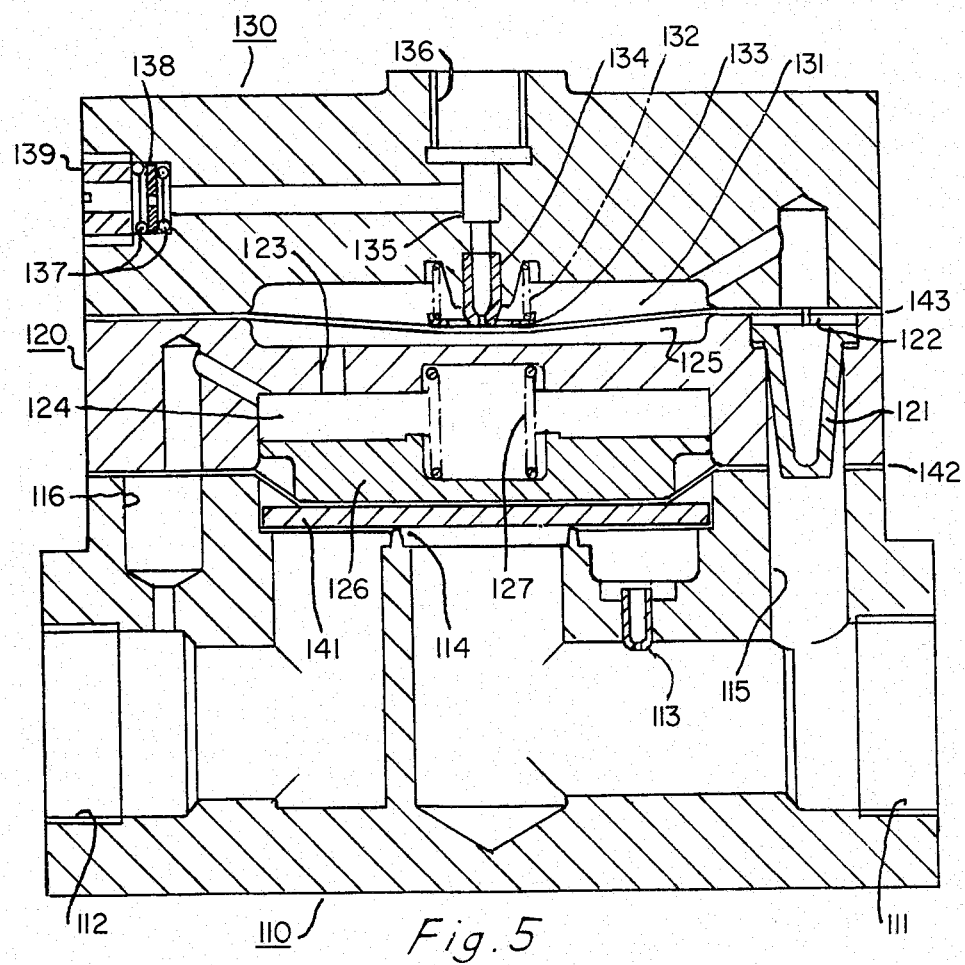
FIG. 5 shows a cross-sectional elevation through a fluid pressure sensing, measuring and controlling arrangement.

Referring now to FIG. 5 this shows an apparatus embodying the invention. The apparatus has a body formed in three parts 110, 120 and 130 respectively. Body part 110 is provided with an inlet port 111 and an outlet port 112 for the connection of fluid pressure conduits. Two parallel fluid pressure paths are provided between these ports. The first, which in operation is always open, is through a restriction in the form of a choke 113. The second, which is selectively closable in operation, of the device, is through a valve seat 114 formed in the body part 110 of the device and by-passes choke 113. A closure element 141 is arranged for selective engagement with valve seat 114 in a manner to be described later.

Diaphragms 142 and 143 and body parts 120 and 130 are stacked alternately on body part 110 and retained in position by fastening means not shown. Diaphragms 142 and 143 have apertures to correspond with the various conduits to be described below. A conduit 115 extends from inlet port 111 through body parts 110, 120 and 130 to a chamber 131 formed by diaphragm 143 and a recess in body part 130. Conduit 115 is provided with a filter 121 and a restriction in the form of an apertured disc or choke 122. Chokes 113 and 122 have similar fluid flow characteristics but choke 122 has these characteristics at a much smaller level of fluid flow values than choke 113. In other embodiments the flow magnitudes may be reversed or more equal. A fluid pressure conduit 116 extends from outlet port 112 through body parts 110 and 120 to a part 124 of a fluid pressure chamber 124, 125. Part 124 is formed between body part 120 and diaphragm 142. A conduit 123 extends from fluid pressure chamber 124 to the then part 125 of this fluid pressure chamber formed between body part 120 and diaphragm 143. A bias spring 127 and a follower 126 for diaphragm 142 are provided in part 124. A bias spring 132 and a follower 133 are provided for diaphragm 143 in chamber 131. Chamber 131 is also provided with a vent 134 providing a valve seat from which a conduit 135 extends to a fluid pressure connection port 136. A branch of conduit 135 extends to a mounting for an exhaust choke. This choke is in the form of an apertured disc 138 trapped between two filter elements 137 by a bush 139. The flows through vent 134 and choke 138 establish an intermediate pressure at port 136 (closed in operation by a pressure gauge) dependent upon the flow through choke 113.

The operation of the device will be described when it is installed in a railway vehicle brake system fluid pressure supply conduit and connected to a pressure gauge. In such an installation inlet port 111 is connected to a source of fluid pressure and outlet port 112 is connected to equipment to be operated by the fluid pressure such as the train pipe of the brake system. A pressure gauge, calibrated in a manner to be described below, is connected to port 136 and mounted at a point suitable for observation.

In a prefered arrangement for a device embodying the invention the device may be mounted on a railway locomotive between the air compressor and the compressed air connection to the train and the pressure gauge would be mounted at the driving position connected to port 136 by a compressed air conduit of suitable dimensions. If the railway locomotive is arranged for driving from more than one position then a pressure gauge can be provided at each position and all the gauges operated by the signal provided by one device.

A device is shown in the drawing with the moving parts in the position they adopt when no pressure is applied. When the device is installed and pressure is applied from the source to inlet port 111 with the outlet port 112 connected to an unpressurised system, the force acting on the diaphragm 142 by virtue of the fluid pressure on the area of valve seat 114 will overcome the force exerted by the bias-spring 127 and the force exerted by the low pressure in part chamber 124 exerted over the area equivalent to seat 114. The closure element 141 will be displaced from seat 114 and fluid will flow through the outlet port 112 into the connected apparatus. As the flow continues the pressure at outlet port 112 and therefore in part chamber 124 will rise.

When the pressure in part chamber 124 reaches the level at which the force exerted on the area of follower 126 equivalent to that of seat 114 together with the force of bias spring 127 equals that force exerted by the fluid pressure on the area of valve seat 114 the closure element 141 will be seated on valve seat 114 and flow through the seat will be stopped. Flow from inlet port 111 to outlet port 112 will however be maintained at a much lower level by fluid flow through choke 113. Choke 113 is usually sized so that sufficient fluid can flow through it to supply the normal losses on the apparatus connected to port 112. The pressure in chamber 124 is therefore maintained at a sufficiently high level to keep the closure element 141 on the valve seat 114. If the loss of fluid from the apparatus connected to port 112 exceeds the amount allowed for by the flow through choke 113 the pressure in chamber 124 will fall and in attempting to supply the greater flow of fluid the pressure drop across choke 113 will increase. If this situation continues a pressure will eventually be reached in part chamber 124 at which bias spring 127 is insufficient to augment the pressure exerted on follower 126 to keep the closure element 141 on the seat 114. The element 141 will lift from the seat 114 and allow the full-bore flow of fluid from port 111 to port 112 to restore the situation to that described above at which the closure element 141 will seat on the valve seat 114.

It will be appreciated that when closure element 141 is seated the pressure difference across choke 113 will be apparent at conduits 115 and 116. Conduit 116 through conduit 123 will apply the pressure at port 112 to part chamber 125 to act on one side of diaphragm 143. The pressure at port 111 will be applied through choke 122 to chamber 131 to act on the other side of diaphragm 143. As explained above chokes 113 and 122 are similar so that the variation of flow with pressure difference across the chokes will be represented by the pressures in chambers 125 and 131. Spring 132 compensates for the out-of-balance force across diaphragm 143 caused by the presence of vent 134.

When the device is in operation as described above then during the initial charge up of the apparatus connected to outlet port 112, the pressure in chamber 131 will exceed that in chamber 125 so the diaphragm 143 will be moved away from the vent 134 permitting the flow of fluid through the vent and through the exhaust choke 138 to atmosphere. An intermediate pressure will be set up in conduit 135 and this pressure will be indicated on a pressure gauge connected to port 136. As the vent 134 will be kept open the gauge reading will be the maximum obtainable in operation of the device. This reading will indicate that the maximum flow is occurring. When the closure element 141 is seated on the valve seat 114 by the rise in pressure in the apparatus connected to outlet 112 the pressure in chamber 125 will also rise until it reaches a value at which the diaphragm 143 is urged against the vent 134 to close it. The pressure trapped by this closure in conduit 135 will exhaust through the choke 138 and the reading on the pressure gauge connected to port 136 will fall. As the vent from chamber 131 is now closed the pressure in the chamber will rise slowly through the choke 122 in the same way as the pressure is rising in apparatus connected to outlet port 112 by fluid flow through choke 113. If the loss of fluid pressure from the connected apparatus is small the flow through choke 113 will be small and the pressure drop across the choke will also be small. The pressure in chamber 125 will be close to that in chamber 131. Any excess pressure in chamber 131 sufficient to displace the diaphragm 143 away from the vent 134 will be quickly dissipated and the vent again closed. Accordingly fluid exhausted from conduit 135 through choke 138 will only be replaced by metered venting through vent 134 and the mean value of the intermediate pressure in the conduit 135 will be low. This low pressure will be registered on the gauge connected to port 136 as a low flow of fluid. The more rapidly fluid is lost from apparatus connected to port 112 the greater will be the flow through choke 113 and therefore the pressure drop across the choke. This pressure drop will result in a lower pressure in chamber 125 which will permit a greater flow of fluid pressure from chamber 131 through vent 134 when the vent is opened by the excess pressure in chamber 131. As the chokes 113 and 122 have similar flow characteristics the replenishment of chamber 131 through choke 122 will be similar to the replenishment of the connecting apparatus through choke 113. Accordingly the magnitude of flow through the vent 134 will increase as the flow and therefore the pressure difference of choke 113 increase. The intermediate pressure in conduit 135 will have a higher mean value and this will be registered by the pressure gauge as a higher value of flow through choke 113. It will be apparent that the pressure gauge may be calibrated in terms of the flow that occurs through choke 113 so long as the closure element 141 is seated on seat 114 and that a point may be marked on the gauge corresponding to the intermediate pressure in conduit 135 when the closure element 141 is unseated from seat 114 as a result of an excessive pressure drop across choke 113.

The device may also incorporate an arrangement to give a warning that the flow from port 111 to port 112 is excessive. This arrangement may be a simplified form of the vent 134 controlled by diaphragm 143. The pressure in that port 111 is applied to the side of the diaphragm closing the vent whilst the pressure at the outlet port is applied to the other side of the diaphragm. No bias spring is necessary in general as the out-of-balance force due to the vent can be used to set the threshold level of the arrangement. When the pressure differential across the diaphragm exceeds the threshold fluid will flow from the input port 111 past the diaphragm and through the vent. This low can then be applied to operate a warning device such as a whistle or the flow itself may be arranged to impinge upon the controller of the vehicle so that he is made aware of the excessive air flow.

Although the invention has been described with reference to embodiments related to fluid flow in railway braking apparatus it is not to be considered limited to such applications. It is applicable to the sensing and measurement of fluid pressure flow generally.

Having thus described our invention what we claim is:

1. Fluid pressure responsive apparatus for sensing measuring and controlling fluid flow in a conduit, comprising a fluid tight vessel internally divided into a first and a second chamber by a pressure responsive member, said first chamber having a first port for a first fluid pressure signal, said second chamber having a second port for a second fluid pressure signal, and said second chamber having a third port, said pressure responsive member comprising a flexible fluid-tight membrane with a surface portion deformable to itself close said third port when the force exerted on said pressure responsive member, including the pressure in the first chamber, exceeds the opposing force exerted on said member, including the pressure in the second chamber, the third port being vented through a restricted passage to atmosphere, the fluid pressure in said passage from said second chamber depending on the degree of closure of the third port by the deformation of the member in response to said excess force, the flow in said passage giving rise to a third fluid pressure signal indicative of the difference between the first and second pressures, a fluid pressure signal utilization arrangement responsive to said third signal, said first port being connected to a first point on said fluid pressure conduit and said second port being connected to a second point on said fluid pressure conduit upstream from a first flow restrictor, which is itself upstream from said first point, through a second flow restrictor of similar flow characteristics to said first flow restrictor such that the flow through one simulates the flow through the other under the same conditions, the fluid pressure utilization arrangement being responsive to the magnitude of said third signal to indicate the flow in said fluid pressure conduit, said fluid pressure conduit having a full-bore by-passing the first restrictor and including a valve for said by-pass controlled by a closure element operable in response to the pressure difference across the first restrictor produced by fluid flow through the restrictor to the downstream part of the conduit.

2. Apparatus as claimed in claim 1 in which the closure element is operated by a further pressure responsive member, to one side of which said further member is applied the fluid pressure in the first chamber, to part of the other side of which is applied the pressure in the fluid pressure conduit downstream from the first restrictor, and to part of the other side of which is applied the pressure in said by-pass upstream of said by-pass valve.

3. Apparatus as claimed in claim 1 in which said fluid pressure conduit is a railway.

4. Apparatus as claimed in claim 2 in which the further pressure responsive member is a further diaphragm.

5. Apparatus as claimed in claim 4 and including a resilient bias means for said further diaphragm.

6. Apparatus as claimed in claim 5 and including a follower through which the thrust of the resilient bias means is applied to the further diaphragm.

7. Apparatus as claimed in claim 6 in which the closure element incorporates a further follower which transmits to the further diaphragm the fluid pressure in said by-pass fluid path upstream of the valve over the full-bore of said path.

8. Apparatus as claimed in claim 5 in which resilient bias means is sized so as to apply to said further diaphragm a differential loading to close the closure element until the pressure in said by-pass upstream of said valve exceeds that downstream of the valve by a predetermined amount.

9. apparatus as claimed in claim 8 in which said predetermined amount is selected to be greater than that pressure drop across the restrictor created by the fluid flow through said restrictor necessary to maintain a fluid pressure system connected downstream of said first point in a charged, quiescent condition.

10. Fluid flow indicator apparatus for sensing and indicating fluid flow in a conduit in a railway vehicle brake system by comparing first and second fluid pressures, comprising a fluid-tight vessel internally divided into a first and second chamber by a pressure responsive member, said first chamber having a first port connected to a first point on said fluid pressure conduit for receiving a first fluid pressure signal, said second chamber having a second port connected to a second point on said fluid pressure conduit for receiving a second fluid pressure signal, said second point on said fluid pressure conduit being upstream from a first flow restrictor, which is itself upstream from said first point, said second port being connected to said second point through a second flow restrictor of similar flow characteristics to said first flow restrictor, said second chamber having a third port, said pressure responsive member having a fluid-tight membrane with a surface portion deformable to itself close said third port when the force exerted on said pressure responsive member by the pressure in the first chamber exceeds the force exerted on said member by the pressure in the second chamber by a predetermined amount, the third port being vented through a restricted passage to atmosphere, the fluid flow in said passage from said second chamber depending on the degree of closure of the third port by the deformation of the diaphragm in response to said excess force, the flow in said passage giving rise to a third fluid pressure signal, and means responsive to the magnitude of said third signal to indicate the flow in said fluid pressure conduit, said conduit having a valve-controlled bypass around said first restrictor.

11. Apparatus as claimed in claim 10 in which the bypass in the fluid pressure conduit is a full-bore bypassing the first restrictor and the valve for said by-pass is controlled by a closure element operable in response to the pressure difference across the first restrictor produced by fluid flow through the restrictor to the downstream part of the conduit.

* * * * *